United States Patent
Subramaniam et al.

(10) Patent No.: US 6,723,359 B2
(45) Date of Patent: Apr. 20, 2004

(54) SPRAY-DRIED COMPOSITIONS AND METHOD FOR THEIR PREPARATION

(75) Inventors: Anandaraman Subramaniam, East Windsor, NJ (US); Robert Clark McIver, Tabernacle, NJ (US); Florin Joseph Vlad, Annandale, NJ (US); Daniel Benczedi, Carouge (CH)

(73) Assignee: Firmenich SA, Geneva (CH)

( * ) Notice: Subject to any disclaimer, the term of this patent is extended or adjusted under 35 U.S.C. 154(b) by 219 days.

(21) Appl. No.: 09/982,648

(22) Filed: Oct. 18, 2001

(65) Prior Publication Data

US 2003/0082276 A1 May 1, 2003

(51) Int. Cl.⁷ .............................. A23L 1/216
(52) U.S. Cl. .................. 426/96; 426/471; 426/650; 426/661
(58) Field of Search ................ 426/89, 96, 471, 426/650, 651, 661

(56) References Cited

U.S. PATENT DOCUMENTS

| | | |
|---|---|---|
| 3,205,175 A | 9/1965 | Maierson ................ 252/316 |
| 5,124,162 A | 6/1992 | Boskovic et al. ............. 426/96 |
| 5,709,895 A | 1/1998 | Tanaka et al. ................ 426/96 |
| 5,897,897 A * | 4/1999 | Porzio et al. ................. 426/96 |
| 6,440,474 B1 * | 8/2002 | Buliga et al. ................. 426/96 |

FOREIGN PATENT DOCUMENTS

| | | |
|---|---|---|
| EP | 1 106 081 A1 | 6/2001 |
| EP | 1 208 754 A1 | 5/2002 |
| GB | 911483 A | 11/1962 |
| GB | 929409 A | 6/1993 |
| WO | WO 98/33394 | 8/1998 |
| WO | WO 00/25606 | 5/2000 |

* cited by examiner

Primary Examiner—George C. Yeung
(74) Attorney, Agent, or Firm—Winston & Strawn LLP

(57) ABSTRACT

The invention relates to a spray-dried composition comprising an active ingredient dispersed in a carrier comprising a combination of a wall-forming carbohydrate material with from 1 to 30% by weight of agar agar relative to the dried weight of the composition. The composition of the invention provides advantageous behavior in an aqueous environment wherein the mobility of the active agent is restricted in the gelled carrier, thus preventing the release of the agent unless shear of heat are applied. Another feature of the invention is a process for the preparation the spray-dried composition.

22 Claims, No Drawings

SPRAY-DRIED COMPOSITIONS AND METHOD FOR THEIR PREPARATION

BACKGROUND OF THE INVENTION

The present invention relates to compositions in an encapsulated form and to a method for the preparation of such compositions.

An encapsulation is a process by which one or more active ingredients are coated with, or entrapped within, another material or system. In the flavor industry, the encapsulation of flavor ingredients serves to retain the aroma in a food product during storage, protects the flavor from undesirable interactions with the food, minimizes flavor/flavor interactions, guards against either light induced reactions or oxidation, and provides a controlled release of the flavor.

In this industry, the most common processes for producing encapsulated products are spray-drying and, to a lesser extent, extrusion and coacervation.

Spray-drying is a well-known useful technique to stabilize flavors by encapsulating them in a solid form, suited to many applications. The spray-drying technology makes it possible to provide the same effect as extrusion, while providing very small particles.

In spray-dried powders, an active ingredient such as a flavor or a fragrance, usually hydrophobic, is entrapped as liquid droplets in a solidified matrix of a dehydrated carrier, generally consisting of carbohydrates, such as starches, hydrolyzed starches (maltodextrin), chemically modified starches, emulsifying polymers (gum arabic) and in certain instances monomers and dimers of simple aldohexoses, or any combination thereof. Conventional spray-drying techniques are perfectly well documented in the prior art. See for example Spray-Drying Handbook, $4^{th}$ ed., K. Masters, (1985) or other reference books on the subject-matter.

The method for the preparation of a spray-dried powder typically first comprises the dispersion of a carrier in water, and then the mixture of this dispersion with a flavor before homogenization to form an oil-in-water emulsion. The emulsion is then spray-dried to produce a powdered flavor.

Flavors are traditionally spray-dried in water-soluble carbohydrate matrices. As these matrices dissolve in water readily, the most common applications of the corresponding powdered flavors are in dry beverage formulations. However, some applications in the flavor industry as well as in other fields such as the perfumery or the pharmaceutical domains require spray-dried products having a different behavior in an aqueous environment. In particular, powders which would not dissolve as quickly in water and which would even require another mechanical trigger for the release of the active ingredient encapsulated in the matrix, could be very useful for many applications.

Means to improve the dispersion of typical spray-dried powders have already been described in the prior art. Agglomeration constitutes such a means and finds applications for instance in instant coffee. However, this process does not suit all applications.

Now, we have been able to establish that a particular ingredient can be added to the carrier constituting the matrix of a spray-dried product, and, in combination with a wall-forming carbohydrate material, surprisingly improve the behavior of the powder in an aqueous environment. This ingredient is agar agar.

Agar agar is a hydrocolloid, the physical properties of which are well known in the art. More particularly, it has a widespread use in foods as a stabilizer, thickener, humectant and surface finisher.

Some patent literature discloses the spray-drying of agar itself to provide it in a solid form. On the other hand, agar is often cited as part of the list of encompassing materials susceptible of constituting carriers in an encapsulation system. As an example, one can cite WO 98/33394 which discloses the mixture of a bulking agent with a hydrocolloid in the form of a solid powder which is used as a stabilizing agent in a wide variety of products. However, no document from the prior art has ever pointed out or even suggested the possibility of using agar in a spray-dried composition for a specific purpose, when used in defined amounts and in combination with a carbohydrate material.

Yet, we have now been able to establish that, in combination with the main carrier material, namely a carbohydrate, and when used in specific amounts, agar agar is an advantageous co-carrier material for a composition intended to be spray-dried. In an unexpected manner, this novel composition proved to be responsible for a complete change in the product's behavior, in an aqueous environment, and as regards the release characteristics of the active ingredient there-encapsulated, compared with conventional spray-dried powders.

SUMMARY OF THE INVENTION

The invention relates to a novel spray-dried composition, comprising one or more active ingredients dispersed in a carrier which comprises at least a wall-forming carbohydrate material and from 1 to 30% by weight of agar agar, relative to the dried weight of the composition.

What is meant here by "active ingredient" is a liquid ingredient, preferably hydrophobic, which is sought to be protected by way of solid encapsulation. It may include volatile perfuming or flavoring ingredients as well as other kinds of ingredients such as pharmaceutical actives for instance.

The composition of the invention presents many advantages. While a typical spray-dried product dissolves instantly in water, the composition according to the present invention behaves in a totally different manner in such a medium and makes it possible to provide a controlled release of the encapsulated active ingredient.

Other embodiments of the invention include a method for the preparation of such a spray-dried composition, and its use for the flavoring or perfuming of consumer products such as foods, beverages, or perfuming compositions.

Finally, the spray-dried powder of the invention can also be advantageously used as an intermediate product or starting product for a double-encapsulation method, i.e., as a solid product susceptible of being subjected to a further encapsulation such as an extrusion in a glassy matrix to provide a granular delivery system, or to a second spray-drying operation in a distinct or similar matrix.

Further features, aspects and advantages of the invention will become apparent from the detailed description hereafter.

DETAILED DESCRIPTION OF THE PREFERRED EMBODIMENTS

The present invention thus concerns a composition in the form of a spray-dried powder, comprising one or more active ingredients dispersed in a carrier, wherein said carrier comprises at least one wall-forming carbohydrate material and from 1 to 30% of agar agar, relative to the dried weight of the composition. In another embodiment, the proportion of agar agar in the composition can be limited to 1 to 20%, or even to 1 to 15% by weight, relative to the dried weight of the composition.

The spray-dried product of the invention is very useful in particular in an aqueous environment, where it provides a release of the active ingredient quite distinct from typical systems known in the prior art. More particularly, the addition of a certain amount of agar agar in the carrier matrix, in combination with a wall-forming carbohydrate material, provides a structure which swells upon hydration almost instantly and forms a gel wherein the mobility of the active ingredient in the form of oil droplets is restricted. As a consequence, even when excess water is present, the gel containing the oil droplets remains intact. Therefore, if the hydrated powder particles are left undisturbed, i.e., are not subjected to constant shear at room temperature, they can retain their integrity for at least 2 weeks, after which the release of the oil from the hydrated particles, when deformed under pressure, is observable. Thus, while typical spray-dried products dissolve instantaneously in an aqueous environment, providing an instant release of the encapsulated active ingredient, the system of the invention provides a controlled release of the active substance. Under another kind of trigger such as the application of shear force or heat, the active substance will be released from the dry powder.

The carrier of the spray-dried composition comprises at least one wall-forming carbohydrate material and from 1 to 30% of agar agar which may be in a partially hydrated form. This combination is responsible for the technical effect described herein.

Suitable wall-forming carbohydrate materials are substrates such as polyvinyl acetate, polyvinyl alcohol, dextrins, natural or modified starch, pectins, xanthans, alginates, or yet cellulose derivatives such as for example carboxymethyl cellulose, methyl cellulose or hydroxyethylcellulose. In one particular embodiment of the invention, the carbohydrate material is selected from the group consisting of a maltodextrin, or a corn syrup, a chemically modified starch, a hydrogenated starch hydrolysate, a succinylated or hydrolyzed starch.

The composition of the invention typically comprises from 70 to 99% by weight, relative to the dried weight of the composition, of wall-forming carbohydrate material. Preferably, it contains from 40 to 80% of carbohydrate material.

In a preferred embodiment, the matrix composition further comprises a plasticizer such as a sugar or sugar derivative, such as sucrose, glucose, lactose, levulose, fructose, maltose, ribose, dextrose, isomalt, sorbitol, mannitol, xylitol, lactitol, maltitol, pentatol, arabinose, pentose, xylose, galactose. Typically, the compositions of the invention may comprise from 0.1 to 50% by weight, relative to the weight of the dried product, of plasticizer.

An agar agar matrix, further comprising maltodextrin in admixture with one of the sugars mentioned above, in particular sucrose, is particularly appreciated.

In addition to carbohydrates and plasticizers, the composition of the invention may comprise an emulsifier intended to promote a homogeneous mix of the oil in the carbohydrate based mixture before spray-drying. The nature and proper amount of the emulsifier can be critically assessed by the process operator without undue experimentation. Typically, proportions form 1 to 30% by weight, relative to the dried weight of the composition, can be used.

Many suitable emulsifiers are known in the trade. Typical examples include soya lecithin, CAPSUL® (modified maize starch from National Starch), citric acid esters of fatty acids and emulsifying polymers such as gum arabic, but other suitable emulsifiers are cited in reference texts such as Food Emulsifiers and their Applications, 1997, edited by G. L. Hasenhuettl and R. W. Hartel, USA.

Finally, the composition of the invention, which is initially in the form of an aqueous emulsion, contains, before being spray-dried, from 50 to 90% of water, preferably from 60 to 85% by weight of water, relative to the total weight of the emulsion.

The active ingredient dispersed in the carrier of the spray-dried composition of the invention will preferably be a hydrophobic flavor or fragrance ingredient or composition of current use. However, the polarity or aqueous solubility of the active ingredient may be chosen as a function of the desired retardation of the release for a given application. In fact, more hydrophilic components will be released faster, as they are able to partition in the outer aqueous phase.

The terms "flavor and fragrance ingredient or composition" as used herein are deemed to define a variety of flavor and fragrance materials of both natural and synthetic origin. They include single compounds and mixtures. The composition of the invention can encapsulate volatile or labile components in liquid form, preferably hydrophobic. Specific examples of such components may be found in the current literature, e.g., in Fenaroli's Handbook of Flavor Ingredients, 1975, CRC Press; Synthetic Food Adjuncts, 1947 by M. B. Jacobs, edited by Van Nostrand; or Perfume and Flavor Chemicals by S. Arctander 1969, Montclair, N.J. (USA). These substances are well known to the person skilled in the art of perfuming, flavoring, and/or aromatizing consumer products, i.e., of imparting an odor and/or a flavor or taste to a consumer product traditionally perfumed or flavored, or of modifying the odor and/or taste of said consumer product.

Natural extracts can also be encapsulated into the system of the invention; these include e.g., citrus extracts such as lemon, orange, lime, grapefruit or mandarin oils, or coffee, tea, mint, cocoa, vanilla or essential oils of herbs and spices, among others.

The proportions of active ingredient in the composition are typically between 0.1 to 60% by weight, relative to the dried weight of the composition. In a particular embodiment, the proportion of the active ingredient is comprised between 20 and 50%.

The method for the preparation of a spray-dried powder comprises the steps of emulsifying the active ingredient with an aqueous solution of the matrix carrier comprising at least one wall-forming carbohydrate material and from 1 to 30%, preferably from 1 to 20% or more preferably from 1 to 15% of agar agar; homogenizing the emulsion and spray drying the latter to form a particulate product.

One particular advantage of the process according to the invention lies in the fact that the compositions comprising a combination of agar agar with a carbohydrate, as described herein, demonstrate a retention of the active ingredient (e.g., oil) which is advantageously not affected by a variation in the solid content of the starting aqueous emulsion. More particularly, in classical spray-drying processes, a high dilution rate, useful to provide monodispersity of the powder, must be balanced with the fact that the higher is the dilution rate, the lower will be the flavor retention. It is furthermore established that 10% lower solid content in the initial aqueous emulsion should result in noticeably decreasing the flavor retention after spray-drying. Now, it turned out in the present case that, as shown in the examples below, the flavor retention of the product of the invention is not affected by the dilution rate, or solid content in the aqueous emulsion introduced into the spray-drier. In other words, high dilution rates may be employed in order to get a good monodispersity of the powder without causing any drawbacks on flavor retention, a totally unexpected result for this kind of composition.

The spray-drying apparatus used in the process of the invention can be any of the various commercially available apparatus. Examples of spray-drying apparatuses are the Anhydro Dryers (origin: Anhydro Corp. of Attleboro Falls, Mass.), the Niro Dryer (manufactured by Niro Atomizer Ltd., Copenhagen, Denmark), or a Leaflash apparatus (origin: CCM Sulzer). A spray-drier with a pressure nozzle is preferred.

The process will be described below in a more detailed manner in Example 1. However, the parameters are not critical and the characteristics of a spray-drying process are well known in the art and can be easily adjusted by the skilled artisan.

The particulates of the invention typically have a size of between 50 and 70 μm and a bulk density of between 0.4 and 0.6 g/cm$^3$. However, a skilled person in the art knows well that the granulometry and the bulk density of the resulting dry powders can be adjusted by selecting the nozzle pressure until the powder having the desired flowability is obtained, so that other values are possible if desired.

The spray-dried powders prepared according to a process of the invention can be utilized as such in applications, for instance for the perfuming or flavoring of compositions wherein a release is induced by shear or heat. However, they also can be advantageously used as starting materials to be subjected to further processing, before being used as delivery systems in a variety of applications.

In particular, in one embodiment of the invention, the spray-dried particles obtained by the method described herein are further encapsulated in an extruded glassy matrix which may be formed from one or more carbohydrate materials or which may just comprise a plasticizer and an emulsifying agent, in order to produce a glassy matrix with an improved thermal stability. U.S. Pat. No. 5,087,461, the content of which is hereby expressly incorporated herein by reference, describes and exemplifies an encapsulation method of a spray-dried composition by way of extrusion. This process leads to narrow rods having a diameter in the range of 0.3 to 3 mm.

Apart from the extrusion, other kinds of encapsulation processing, following the spray-drying, are possible. The powder obtained can for instance be submitted to a second spray-drying, thus providing a two-stage spray-dried product. This technique in particular, as well as multi-stage spray-drying in general, are described by W. J. Coumans, P. J. A. M. Kerkhof and S. Bruin in Drying Technology, Vol. 12 (1 and 2), (1994), the teaching of which is also hereby included by reference.

These examples are not restrictive of the encapsulation techniques which can be used for further processing of the spray-dried powder obtained according to the present invention, notably with the aim of increasing the size of the particles, or improving a particular characteristic of the powder, in order to rend it suitable for specific applications.

The products of the invention, namely the spray-dried powder as such, as well as the spray-dried compositions further subjected to a second kind of encapsulation can be advantageously used for instance for the perfuming or flavoring of food compositions in particular.

Therefore, the delivery systems of the invention can be used in applications such as chewing gums or chewing sweets, savory food or baking in the field of flavors. Similarly the field of perfumery comprises many applications where this kind of encapsulation systems may be very useful. For instance all kinds of deodorants and antiperspirants constitute suitable applications for a perfuming delivery system with a controlled release of the perfuming ingredient and wherein the integrity of the latter is desirable until consumer use of for a certain period of time.

In those applications, the compositions of the invention provide a flavor or fragrance retention of up to 85% after the encapsulation process, at a fix level as high as 50%, and in an unexpected manner, the flavor retention being independent of the solid content of the aqueous emulsion introduced into the spray-drier. Moreover, the product hydrates very slowly in water and does not dissolve up to two weeks.

EXAMPLES

The invention will be now described in a more detailed manner in the examples below, wherein the temperatures are indicated in degrees Celsius and the abbreviations have the usual meaning in the art.

Example 1

Preparation of a Spray-dried Composition According to the Invention

Formulation

| Ingredients | Grams | % dry |
|---|---|---|
| Maltodextrin 18DE | 1729 | 24.70 |
| Sucrose | 1729 | 24.70 |
| Agar agar | 700 | 10.00 |
| Lemon oil [1] | 2800 | 40.00 |
| Lecithin | 42 | 0.60 |
| Water | 13600 | |
| Total | | 100.00 |

[1] origin: Firmenich Citrus Center, Florida, USA

Preparation

A batch was prepared by hydrating agar agar in water (approximately 10% solids level) and subsequently mixing it with the rest of the ingredients in a stainless kettle equipped with pneumatic agitation. The batch temperature was maintained at 65–70°. When the contents of the kettle were uniform, it was homogenized at 7000 kPa.

The prepared feed was dried with a Leaflash apparatus characterized by the respective inlet /outlet temperatures of 180/80°; a feed pressure of 17×10$^3$ Pa; and a nozzle 70/216 (spraying system) (diameter of spray orifice/spinner nozzle).

Samples were collected and analyzed for oil content by steam distillation. The flavor retention of the particulates after the process was of 85% (solid content of the aqueous emulsion introduced into the spray-drier of 33.98%).

Hydration characteristics and oil droplets release were investigated by microscopy. Thus, after 2 weeks in water, no oil coming out of the powder was observed. The particulates were intact.

Example 2

Preparation of a Spray-dried Composition According to the Invention

Formulation

| Ingredients | Grams | % dry |
|---|---|---|
| Maltodextrin 18DE | 1379 | 19.70 |
| Sucrose | 1379 | 19.70 |
| Agar agar | 700 | 10.00 |
| Lemon oil [1] | 3500 | 50.00 |
| Lecithin | 42 | 0.60 |
| Water | 15200 | |
| Total | | 100.00 |

[1] see Example 1

Preparation: The spray-dried powder was prepared as described in Example 1.

The final product (after the process) had a flavor retention of 87.80% (solid content of the aqueous emulsion introduced into the spray-drier of 31.53%).

No oil droplets diffused from the particles after 2 weeks in water.

Example 3

Preparation of a Spray-dried Composition According to the Invention

Formulation

| Ingredients | Grams | % dry |
|---|---|---|
| Maltodextrin 18DE | 1554 | 22.20 |
| Sucrose | 1554 | 22.20 |
| Agar agar | 1050 | 15.00 |
| Lemon oil [1] | 2800 | 40.00 |
| Lecithin | 42 | 0.60 |
| Water | 23200 | |
| Total | | 100.00 |

[1] see Example 1

Preparation: The spray-dried powder was prepared as described in Example 1.

The final product (after the process) had a flavor retention of 85.30% (solid content of the emulsion introduced into the spray-drier of 23.18%).

No oil droplets diffused from the particles after 2 weeks in water.

Example 4

Preparation of a Spray-dried Composition According to the Invention

Formulation

| Ingredients | Grams | % dry |
|---|---|---|
| Maltodextrin 18DE | 798 | 11.40 |
| Sucrose | 1554 | 22.20 |
| Agar agar | 1050 | 15.00 |
| Gum Arabic | 798 | 11.40 |
| Lemon oil [1] | 2800 | 40.00 |
| Water | 18200 | |

| Ingredients | Grams | % dry |
|---|---|---|
| Total | | 100.00 |

[1] see Example 1

Preparation: The spray-dried powder was prepared as described in Example 1.

The final product (after the process) had a flavor retention of 87.00% (solid content of the emulsion introduced into the spray-drier of 27.78%).

No oil droplets diffused from the particles after 2 weeks in water.

Example 5

Preparation of a Spray-dried Composition According to the Invention

Formulation

| Ingredients | Grams | % dry |
|---|---|---|
| Maltodextrin 18DE | 2079 | 29.70 |
| Sucrose | 2079 | 29.70 |
| Agar agar | 700 | 10.00 |
| Fragrance [1] | 2100 | 30.00 |
| Lecithin | 42 | 0.60 |
| Water | 13600 | |
| Total | | 100.00 |

[1] origin: Firmenich SA, Geneva, Switzerland

Preparation: The spray-dried powder was prepared as described in Example 1.

The final product (after the process) had a flavor retention of 100% (solid content of the emulsion introduced into the spray-drier of 33.98%).

No oil droplets diffused from the particles after 2 weeks in water.

Example 6

Spray-dried Composition of the Invention, Further Extruded in a Glassy Matrix A spray-dried composition was prepared as described in Example 1 from the following formulation:

| Ingredients | % dry |
|---|---|
| Maltodextrin 18DE | 84 |
| Agar agar | 5 |
| Orange oil | 1 |
| Citrem | 5 |
| Neobee | 5 |
| Total | 100 |

The obtained powder was extruded under $2 \times 10^5$ Pa pressure through a die plate with 0.8 mm diameter holes at a temperature of 95° C.

What is claimed is:

1. A spray-dried composition comprising one or more active ingredients dispersed in a carrier wherein said carrier comprises at least one wall-forming carbohydrate material and from 1 to 30% by the weight of agar agar, relative to the dried weight of the composition.

2. A spray-dried composition according to claim 1, which comprises from 0.01 to 50% of a plasticizer selected from the group consisting of a mono- and a disaccharide.

3. A spray-dried composition according to claim 1, wherein the carrier comprises from 1 to 20% by weight of agar agar, relative to the dried weight of the composition.

4. A spray-dried composition according to claim 1, wherein the carrier comprises from 1 to 15% by weight of agar agar, relative to the dried weight of the composition.

5. A spray-dried composition according to claim 1, wherein the wall-forming carbohydrate material is selected from the group consisting of maltodextrin, corn syrup, chemically modified starch, hydrogenated starch hydrolysate, and succinylated or hydrolyzed starch.

6. A spray-dried composition according to claim 5, wherein the wall-forming consists of maltodextrin.

7. A spray-dried composition according to claim 6, which comprises from 0.01 to 50% of a plasticizer selected from the group consisting of a mono- and a disaccharide.

8. A spray-dried composition according to claim 1, which comprises from 1 to 30% by weight of an emulsifier, relative to the dried weight of the composition.

9. A spray-dried composition according to claim 1, wherein the active ingredient is a perfuming ingredient.

10. A spray-dried composition according to claim 1, wherein the active ingredient is a flavoring ingredient.

11. A spray-dried composition according to claim 1, comprising from 1 to 60% of active ingredient relative to the dried weight of the composition.

12. A spray-dried composition according to claim 1, comprising from 20 to 50% of active ingredient relative to the dried weight of the composition.

13. A granular delivery system obtainable by a method comprising the steps of:
 a) forming an aqueous emulsion of an active ingredient dispersed in a carrier comprising at least one wall-forming carbohydrate material and from 1 to 30% of agar agar;
 b) homogenizing the emulsion; and
 c) spray-drying the emulsion to form the granular delivery system as a particulate product.

14. A multi-stage spray-dried powder obtainable by a method comprising the steps of:
 a) forming an aqueous emulsion of an active ingredient dispersed in a carrier comprising at least one wall-forming carbohydrate a material and from 1 to 30% of agar agar;
 b) homogenizing the emulsion;
 c) spray-drying the emulsion to form a particulate product; and
 d) further encapsulating the spray dried product; wherein the encapsulation consists in spray-drying the particulate product in order to form a multi-stage spray-dried powder.

15. A granular delivery system according to claim 13, which comprises from 0.01 to 50% of a plasticizer selected from the group consisting of a mono- and a disaccharide or from 1 to 30% by weight of an emulsifier, relative to the dried weight of the composition.

16. A granular delivery system according to claim 13, wherein the wall-forming carbohydrate material is selected from the group consisting of maltodextrin, corn syrup, chemically modified starch, hydrogenated starch hydrolysate, and succinylated or hydrolyzed starch.

17. A granular delivery system according to claim 13, wherein the active ingredient is a perfuming ingredient and is present in an amount of from 1 to 60% relative to the dried weight of the composition.

18. A granular delivery system according to claim 13, wherein the active ingredient is a flavoring ingredient and is present in an amount of from 1 to 60% relative to the dried weight of the composition.

19. A multi-stage spray-dried powder according to claim 14, which comprises from 0.01 to 50% of a plasticizer selected from the group consisting of a mono- and a disaccharide or from 1 to 30% by weight of an emulsifier, relative to the dried weight of the composition.

20. A multi-stage spray-dried powder according to claim 14, wherein the wall-forming carbohydrate material is selected from the group consisting of maltodextrin, corn syrup, chemically modified starch, hydrogenated starch hydrolysate, and succinylated or hydrolyzed starch.

21. A multi-stage spray-dried powder according to claim 14, wherein the active ingredient is a perfuming ingredient and is present in an amount of from 1 to 60% relative to the dried weight of the composition.

22. A multi-stage spray-dried powder according to claim 14, wherein the active ingredient is a flavoring ingredient and is present in an amount of from 1 to 60% relative to the dried weight of the composition.

* * * * *